UNITED STATES PATENT OFFICE.

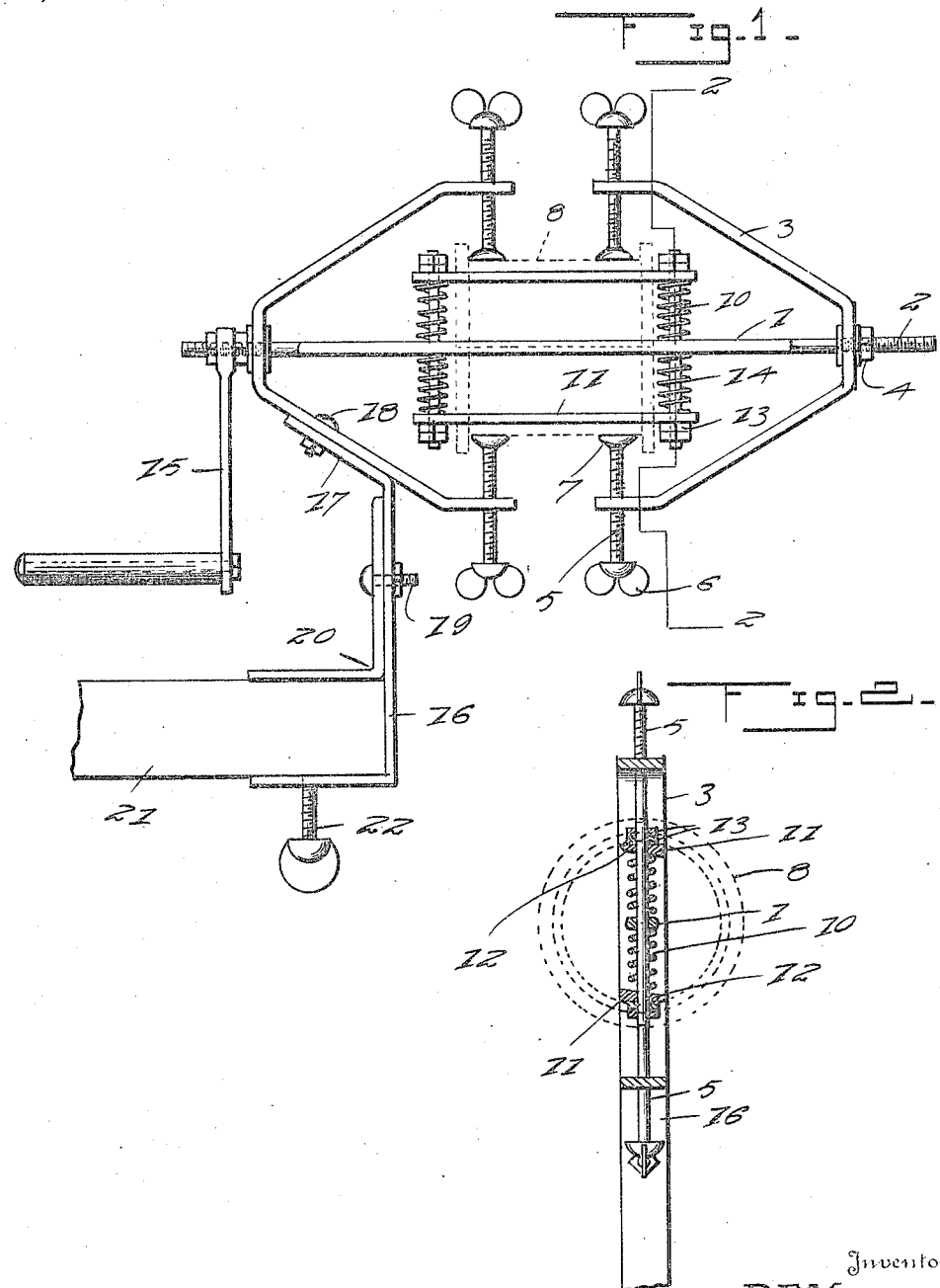

RALPH E. MONROE, OF CAMP VERDE, ARIZONA.

DEVICE FOR SETTING UP BEARINGS.

1,207,602. Specification of Letters Patent. Patented Dec. 5, 1916.

Application filed July 25, 1916. Serial No. 111,263.

*To all whom it may concern:*

Be it known that I, RALPH E. MONROE, a citizen of the United States, residing at Camp Verde, in the county of Yavapai and State of Arizona, have invented certain new and useful Improvements in Devices for Setting Up Bearings; and I do hereby declare the following to be a full, clear, and exact description of the invention, such as will enable others skilled in the art to which it appertains to make and use the same.

This invention relates to a device for setting up bearings and has for its primary object to provide means whereby a bearing may be firmly held and ground to a proper size to fit a shaft or the like.

Another object of this invention is to provide a pair of members for supporting a bearing firmly, so that upon rotation of a pair of knives therein, the bearing will be properly cut or ground to the correct size of a shaft or the like.

A further object of this invention is to provide a pair of adjustable knives which may be readily adjusted to the dimension of a desired shaft or the like and which may be contracted so as to be inserted in a bearing of considerable smaller dimension and that will continue to cut or grind the bearing until the proper dimension of the bearing has been obtained to fit the shaft or the like.

A still further object of this invention is the provision of a device for setting up bearings of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which—

Figure 1 is a front elevation of a device for setting up bearings, constructed in accordance with my invention, and Fig. 2 is a vertical sectional view taken on the line 2—2 of Fig. 1.

Referring in detail to the drawing, the numeral 1 indicates a horizontal rod or shaft having each end screw-threaded as illustrated at 2. A pair of substantially V-shaped members 3 have web portions apertured and screw-threaded to be threaded upon each end of the rod or shaft 1. Adjusting nuts 4 are threaded on the ends of the shaft or rod 1 for holding the members 3 at adjusted positions upon the rod or shaft 1. The ends of the members 3 are apertured and screw-threaded to receive clamping bolts 5 which have mounted upon their outer ends wing nuts 6 and their inner end enlarged to form feet 7 for engagement with the outer wall of a bearing 8 to firmly clamp the bearing 8 to the members 3 about the shaft or rod 1. The bearing 8 is of the two sectional type.

The rod or shaft 1 has a pair of relatively spaced openings to receive knife supporting rods 10 on which are slidably mounted knives 11 having cutting edges 12. The rods 10 have their ends screw-threaded to receive adjusting nuts 13 and have mounted thereon coil springs 14 which bear against the shaft or rod 1 and against the knives 11 for urging the knives into an engagement with the adjusting nuts 13 to cause the knives 11 to engage the inner wall of the bearing 8 at all times. A crank handle 15 is secured to one end of the shaft or rod 1 for rotating the shaft or rod 1 to cause the knives 11 to cut or grind the inner wall of the bearing 8.

A substantially L-shaped bracket 16 having a substantially right angled extension 17 formed thereon is bolted to one of the arm portions of the substantially V-shaped members 3 as illustrated at 18. The bracket 16 is apertured to receive a bolt 19 for securing an L-shaped bracket 20 thereto which coöperates with the bracket 16 for clamping the device upon a table 21 or the like. A suitable set screw 22 is carried by one of the arm portions of the L-shaped bracket 16 for an engagement with the table 21 to firmly secure the device thereto.

In operation, the cutting knives 11 are adjusted upon the knife supporting rods 10 by the adjusting nuts 13 to the exact size of the shaft or the like on which the bearing is to be used by first setting a pair of calipers to the exact size of the shaft or the like and then adjusting the cutting knives 11 to a corresponding dimension. The cutting knives 11 are then contracted against the tension of the springs and the bearing 8 is inserted upon the knives 11 about the shaft or rod 1. The clamping rods 5 are then turned within the ends of the substantially V-shaped members 3 until the feet portions thereof tightly engage the outer wall of the bearing. By turning the crank handle 15, the knives 11 are rotated and will grind or cut the inner wall of the bearing to the exact size of the shaft or until the knives engage the nuts 13 which will limit any further cutting action of the knives upon the bearing.

From the foregoing description taken in connection with the accompanying drawing, it will be noted that a bearing may be readily and quickly cut or ground to the proper size to fit a desired shaft or the like by first adjusting the cutting blades 11 and then placing the bearing upon the blades and turning the adjusting rods until the sections of the bearing have been clamped together whereby upon rotation of the crank handle, the inner wall of the bearing will be ground or cut to the desired dimension.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a rod, substantially V-shaped members adjustably secured to each end of the rod, means for rotating the rod, means carried by the substantially V-shaped members for clamping a bearing thereto, and means carried by the rod for cutting the bearing to a desired dimension.

2. A device of the character set forth comprising a rod, substantially V-shaped members adjustably secured to each end of the rod, adjusting bolts carried by the ends of the substantially V-shaped members for clamping a bearing thereto, and means carried by the rod for cutting the bearing to a desired dimension.

3. A device of the character set forth comprising a rod, substantially V-shaped members adjustably secured to each end of the rod, means for clamping a bearing to the substantially V-shaped members, a pair of cutting knives carried by the rod for cutting the bearing to a desired dimension, and means for rotating the knives.

4. A device of the character set forth comprising a rod, a pair of substantially V-shaped members adjustably secured to each end of the rod, means for clamping a bearing to the substantially V-shaped members, adjustable knives carried by the rod for cutting the bearing to a desired dimension, and means for rotating the knives.

5. A device of the character set forth comprising a rod, substantially V-shaped members carried by the rod, means for clamping a bearing to the members, knife supporting rods carried by the rod, cutting knives mounted upon the knife supporting rods for an engagement with the inner wall of a bearing, adjusting nuts carried by the knife supporting rods for adjusting the dimension of the knives, and springs mounted upon the knife supporting rods for urging the knives into an engagement with the adjusting nuts.

6. A device of the character set forth comprising a rod, substantially V-shaped members carried by the rod, means for clamping a bearing to the V-shaped members, adjustable knives carried by the rod for an engagement with the inner wall of the bearing, a crank handle secured to the rod for rotating the knives to cut the bearing to a desired dimension, and a bracket secured to one of the substantially V-shaped members and to a permanent object for supporting the device in a substantially horizontal plane.

In testimony whereof I affix my signature in presence of two witnesses.

RALPH E. MONROE.

Witnesses:
 WILLIAM BACK,
 EARL N. REID.

Copies of this patent may be obtained for five cents each, by addressing the "Commissioner of Patents, Washington, D. C."